United States Patent
Hung

(10) Patent No.: US 9,666,142 B2
(45) Date of Patent: May 30, 2017

(54) DISPLAY CAPABLE OF REDUCING PASSIVE MATRIX COUPLING EFFECT

(71) Applicant: SiPix Technology, Inc., Taoyuan (TW)

(72) Inventor: Chi-Mao Hung, Hsinchu (TW)

(73) Assignee: SiPix Technology, Inc., Taoyuan (TW)

(*) Notice: Subject to any disclaimer, the term of this patent is extended or adjusted under 35 U.S.C. 154(b) by 0 days.

(21) Appl. No.: 14/828,535

(22) Filed: Aug. 18, 2015

(65) Prior Publication Data

US 2015/0356927 A1     Dec. 10, 2015

Related U.S. Application Data

(63) Continuation-in-part of application No. 14/155,329, filed on Jan. 14, 2014, now Pat. No. 9,147,364.

(30) Foreign Application Priority Data

Feb. 20, 2013  (TW) .............................. 102105913 A

(51) Int. Cl.
G09G 3/34     (2006.01)
G02F 1/167    (2006.01)

(52) U.S. Cl.
CPC ............. *G09G 3/344* (2013.01); *G02F 1/167* (2013.01); *G09G 2300/0426* (2013.01);
(Continued)

(58) Field of Classification Search
CPC ............... G09G 3/344; G09G 2300/06; G09G 2320/0204; G09G 2300/0426; G09G 2320/0209; G02F 1/167
See application file for complete search history.

(56) References Cited

U.S. PATENT DOCUMENTS 6,909,415 B2   6/2005  Kumagawa
7,439,967 B2  10/2008  Tajiri
(Continued)

FOREIGN PATENT DOCUMENTS

CN    1601337 A    3/2005
CN    1620206 A    5/2005
(Continued)

OTHER PUBLICATIONS

Office action mailed on Sep. 2, 2015 for the China application No. 201410016413.9, filing date Jan. 14, 2014.

*Primary Examiner* — Charles Hicks
(74) *Attorney, Agent, or Firm* — Winston Hsu; Scott Margo

(57) ABSTRACT

A display has a panel, a plurality of first traces and a plurality of second traces. The panel has a first passive matrix and a first coupling capacitor group. The first passive matrix has a plurality of first pixels, and the first coupling capacitor group has a plurality of first coupling capacitors. Each of the first pixels is coupled to a first storage capacitor and corresponds to at least a specific first coupling capacitor of the plurality of first coupling capacitors. The first storage capacitor is coupled to a specific first trace of the plurality of first traces and a specific second trace of the plurality of second traces. The specific first coupling capacitor is coupled to another first trace and the specific second trace, and the specific first coupling capacitor is not directly connected to any of the first pixels.

17 Claims, 14 Drawing Sheets

(52) U.S. Cl.
CPC . *G09G 2300/06* (2013.01); *G09G 2320/0204* (2013.01); *G09G 2320/0209* (2013.01)

(56) References Cited

U.S. PATENT DOCUMENTS

| | | |
|---|---|---|
| 7,453,452 B2 | 11/2008 | Huitema |
| 8,619,011 B2 | 12/2013 | Kimura |
| 2003/0063074 A1 | 4/2003 | Kumagawa |
| 2003/0103021 A1 | 6/2003 | Young |
| 2005/0275352 A1 | 12/2005 | Sun |
| 2008/0252587 A1 | 10/2008 | Wang |
| 2011/0285610 A1* | 11/2011 | Yan .................... G09G 3/20 345/55 |
| 2012/0099180 A1 | 4/2012 | Chiu |

FOREIGN PATENT DOCUMENTS

| | | |
|---|---|---|
| CN | 1732500 A | 2/2006 |
| CN | 1809781 A | 7/2006 |
| CN | 101308301 A | 11/2008 |
| TW | 526363 | 4/2003 |
| TW | 201217877 A1 | 5/2012 |
| TW | 201218154 A1 | 5/2012 |

\* cited by examiner

DISPLAY CAPABLE OF REDUCING PASSIVE MATRIX COUPLING EFFECT

CROSS REFERENCE TO RELATED APPLICATIONS

This application is a continuation-in-part of application Ser. No. 14/155,329, filed 14 Jan. 2014, the contents of which are incorporated herein in their entirety.

BACKGROUND OF THE INVENTION

1. Field of the Invention

The present invention relates to a display, and particularly to a display that can utilize a coupling capacitor group to reduce passive matrix coupling effect.

2. Description of the Prior Art

Please refer to FIGS. 1 and 2. FIG. 1 is a diagram illustrating a pixel P1 of a passive matrix panel 100 being driven according to the prior art, and FIG. 2 is a diagram illustrating an equivalent circuit of storage capacitors CP2 to CP9 corresponding to pixels P2 to P9 adjacent to the pixel P1 when the pixel P1 is driven, where the pixel P1 is coupled to a first trace 102 and a second trace 104. As shown in FIG. 1, when the pixel P1 is driven, the first trace 102 is applied to a first driving voltage (e.g., 15V), the second trace 104 is applied to a second driving voltage (e.g., 0V), and other first traces and other second traces of the passive matrix panel 100 are floating, where the first trace 102 coupled to the pixel P1 is located on a first axis direction of the passive matrix panel 100, the second trace 104 coupled to the pixel P1 is located on a second axis direction of the passive matrix panel 100, and the first axis direction is perpendicular to the second axis direction. Therefore, the pixel P1 can display a first color according to a voltage drop (15V–0V) between the first driving voltage and the second driving voltage stored in a storage capacitor CP1 corresponding to the pixel P1, and each pixel of other pixels of the passive matrix panel 100 can display a previously displayed color.

As shown in FIG. 2, when the first driving voltage is applied to the first trace 102, other pixels of the passive matrix panel 100 are not turned off, so the first driving voltage for driving the pixel P1 can be coupled to storage capacitors (e.g., the storage capacitor CP4 corresponding to the pixel P4 and the storage capacitor CP7 corresponding to the pixel P7) corresponding to pixels coupled to the first trace 102, resulting in each pixel of the pixels coupled to the first trace 102 (e.g., the pixel P4 and the pixel P7) display a color (e.g., a black color, a white color, or neither a black color nor a white color) unwanted by a user. Therefore, the prior art is not a good driving method for the passive matrix panel 100.

SUMMARY OF THE INVENTION

An embodiment of the present invention provides a display which has a panel, a plurality of first traces and a plurality of second traces. The panel has a first passive matrix and a first coupling capacitor group. The first passive matrix has a plurality of first pixels, and the first coupling capacitor group has a plurality of first coupling capacitors. Each of the first pixels is coupled to a first storage capacitor and corresponds to at least a specific first coupling capacitor of the plurality of first coupling capacitors. The first storage capacitor is coupled to a specific first trace of the plurality of first traces and a specific second trace of the plurality of second traces. The specific first coupling capacitor is coupled to another first trace and the specific second trace, and the specific first coupling capacitor is not directly connected to any of the first pixels.

The present invention provides a display capable of reducing passive matrix coupling effect. The display utilizes a plurality of coupling capacitors of a coupling capacitor group to reduce coupling voltages coupled to a plurality of pixels corresponding to a pixel when the pixel is driven according to a driving voltage. Thus, compared to the prior art, the present invention can ensure that each pixel of the panel displays a color wanted by a user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
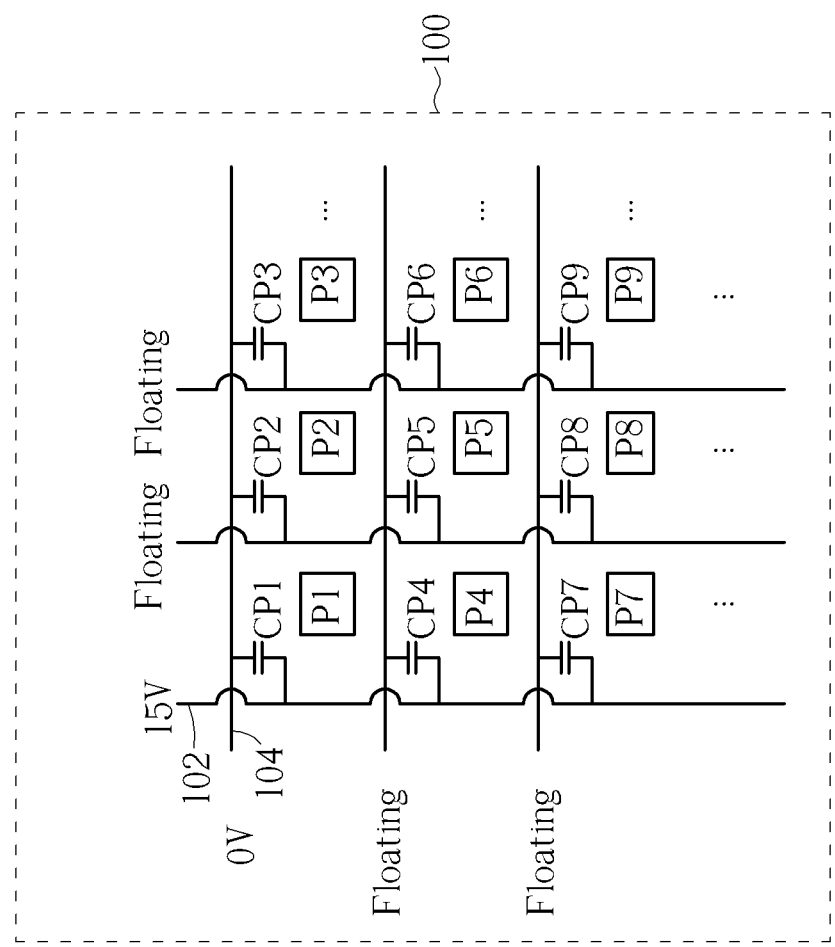
FIG. 1 is a diagram illustrating a pixel of a passive matrix panel being driven according to the prior art.
Figure 2:
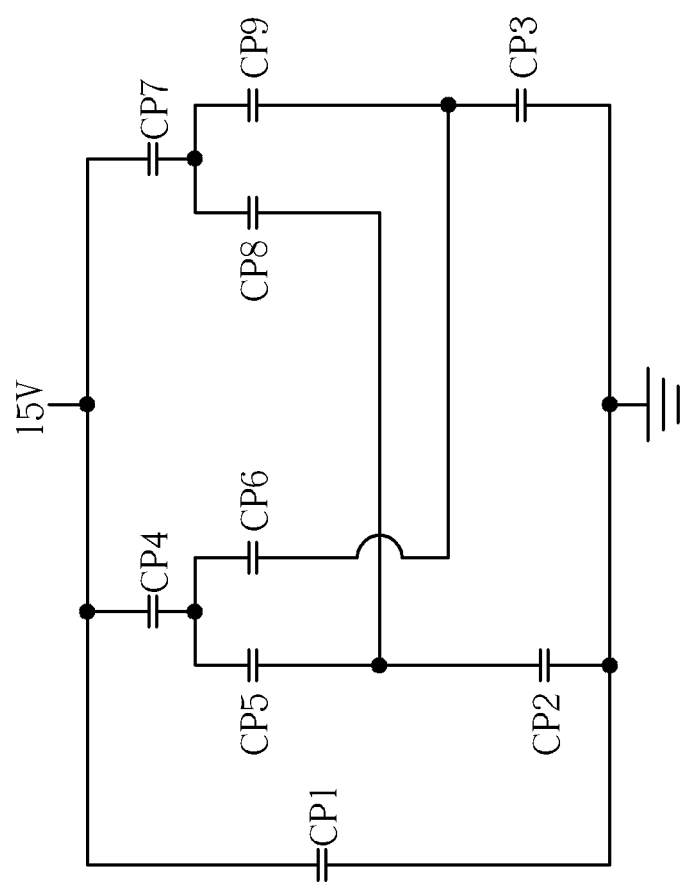
FIG. 2 is a diagram illustrating an equivalent circuit of storage capacitors corresponding to pixels adjacent to the pixel when the pixel is driven.
Figure 3:
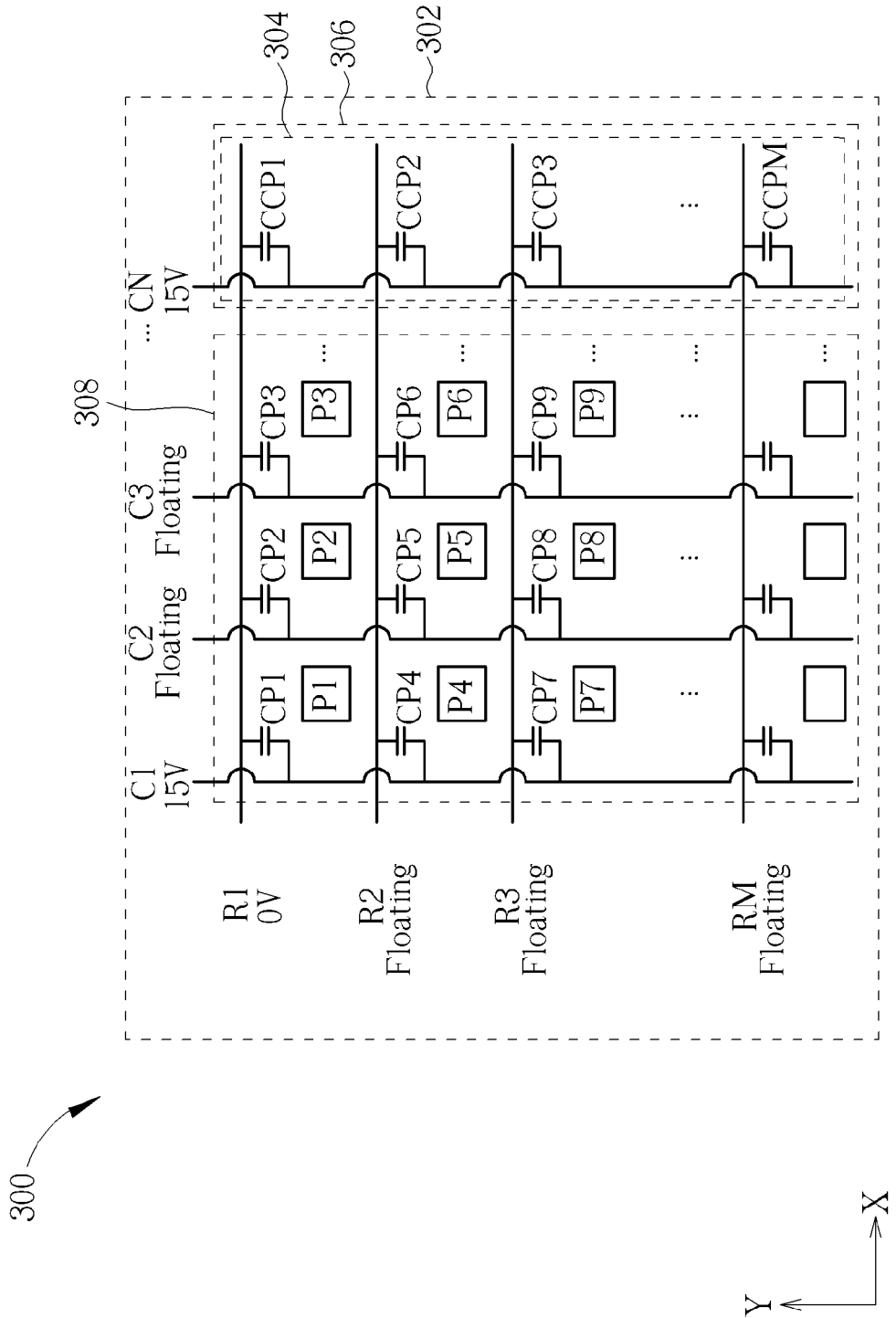
FIG. 3 is a diagram illustrating a display capable of reducing passive matrix coupling effect according to an embodiment of the present invention.

Please refer to FIG. 3. FIG. 3 is a diagram illustrating a display 300 capable of reducing passive matrix coupling effect according to an embodiment of the present invention.

In the embodiment, the display 300 is an electrophoretic display. However, the present invention is not limited thereto. The display 300 may be another type display device such as a liquid crystal display, a plasma display, or an organic EL display. The display 300 has a panel 302, a plurality of first traces C1 to CN, and a plurality of second traces R1 to RM. The panel 302 comprises a passive matrix 308 and a coupling capacitor group 304. The passive matrix 308 comprises a plurality of pixels (e.g., P1 to P9), and a coupling capacitor group 304 comprises a plurality of coupling capacitors CCP1 to CCPM. N and M are positive integers. The plurality of first traces C1 to CN are extended along a vertical axis direction Y, the plurality of second traces R1 to RM are extended along a horizontal axis direction X, and the vertical axis direction Y is perpendicular to the horizontal axis direction X. The coupling capacitors CCP1 to CCPM are located at a periphery region 306 and arranged along the vertical axis direction Y. The periphery region 306 and the passive matrix 308 are non-overlapped. Capacitances of the plurality of coupling capacitors CCP1 to CCPM may be the same or different. In addition, each pixel of the plurality of pixels included in the panel 302 is coupled to a storage capacitor and corresponds to a coupling capacitor, where the storage capacitor is used for storing a driving voltage (e.g., 15V) configured to drive each pixel, the coupling capacitor is used for reducing a coupling voltage coupled to the pixel. For example, a pixel P1 included in the panel 302 is coupled to a storage capacitor CP1 and corresponds to the coupling capacitor CCP1, and a ratio of a capacitance of the coupling capacitor CCP1 to a capacitance of the storage capacitor CP1 is between 0.2 and 2, where the storage capacitor CP1 is coupled to the first trace C1 and the second trace R1, and the coupling capacitor CCP1 is coupled to the first trace CN and the second trace R1. However, the present invention is not limited to the ratio of the capacitance of the coupling capacitor CCP1 to the capacitance of the storage capacitor CP1 being between 0.2 and 2. In other words, any configuration in which utilizing a coupling capacitor to reduce a coupling voltage coupled to a corresponding pixel falls within the scope of the present invention.

Figure 4:
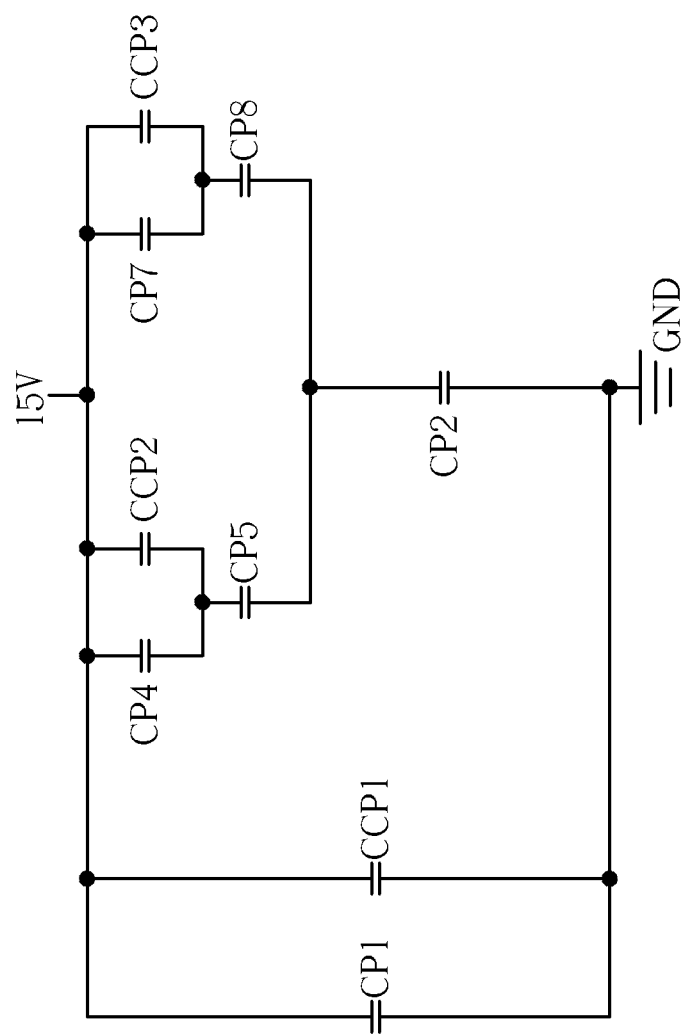
FIG. 4 is a diagram illustrating an equivalent circuit of storage capacitors corresponding to pixels adjacent to the pixel when the pixel is driven.

As shown in FIG. 3, when the pixel P1 is driven according to a driving voltage (e.g., 15V), the first trace C1 and the first trace CN receive the driving voltage (e.g., 15V), the second trace R1 is coupled to ground GND (e.g., 0V), and other first traces of the plurality of first traces C1 to CN and other second traces of the plurality of second traces R1 to RM are floating. Please refer to FIG. 4. FIG. 4 is a diagram illustrating an equivalent circuit of storage capacitors CP2 to CP9 corresponding to pixels P2 to P9 adjacent to the pixel P1 when the pixel P1 is driven. It should be noted that FIG. 4 is only used to describe the present invention, and the present invention is not limited to pixels adjacent to the pixel P1 are only the pixels P2 to P9. As shown in FIGS. 3 and 4, when the pixel P1 is driven according to the driving voltage (e.g., 15V), because the coupling capacitor CCP2 is parallel to the pixel P4 and the coupling capacitor CCP3 is parallel to the pixel P7, the coupling capacitor CCP2 can reduce a coupling voltage coupled to the pixel P4 and the coupling capacitor CCP3 can reduce a coupling voltage coupled to the pixel P7.

Figure 5:
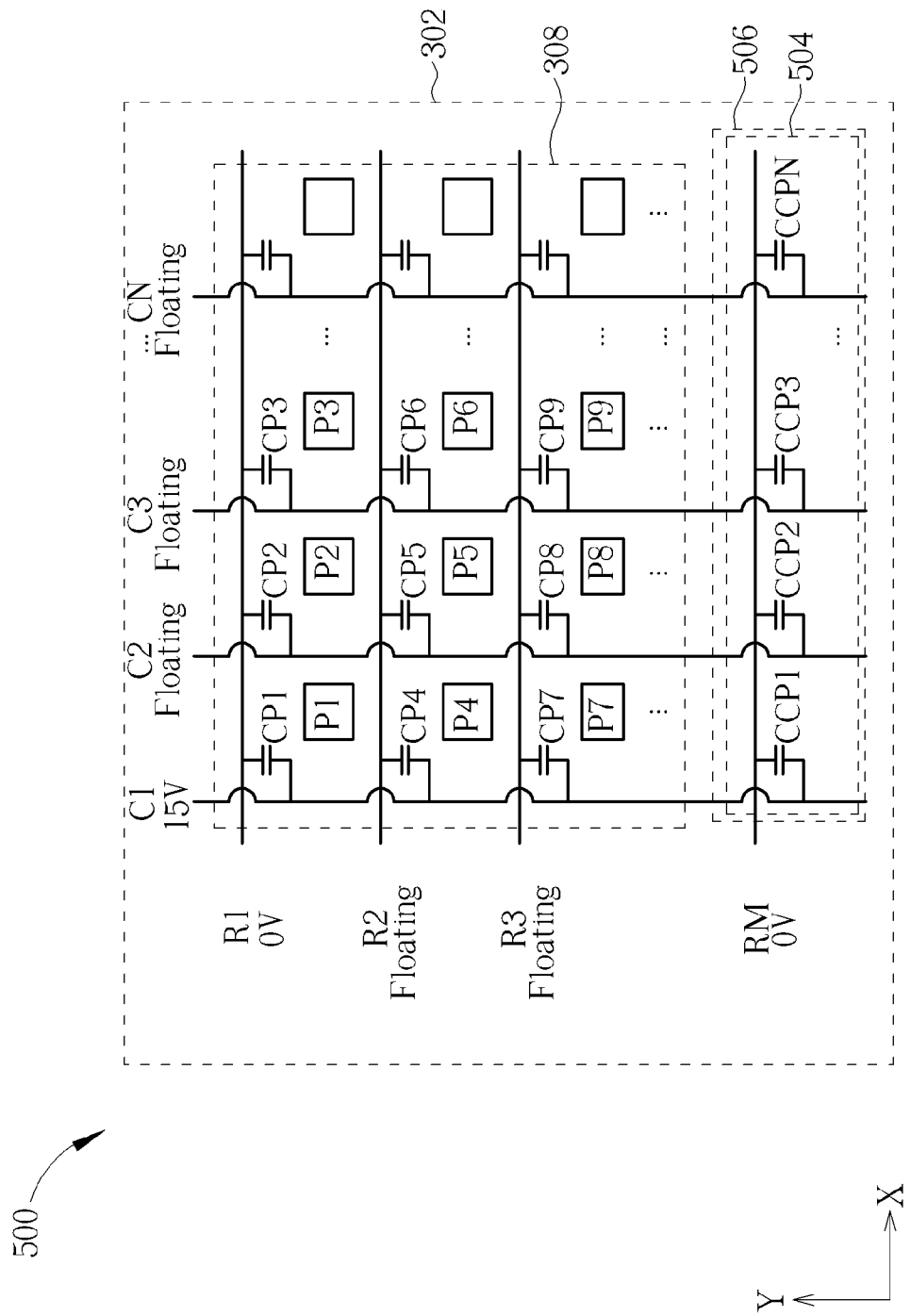
FIG. 5 is a diagram illustrating a display capable of reducing passive matrix coupling effect according to another embodiment of the present invention.

Please refer to FIG. 5. FIG. 5 is a diagram illustrating a display 500 capable of reducing passive matrix coupling effect according to another embodiment of the present invention. The display 500 has a panel 302, a plurality of first traces C1 to CN, and a plurality of second traces R1 to RM. The panel 302 comprises a passive matrix 308 and a coupling capacitor group 504. The coupling capacitor group 504 has a plurality of coupling capacitors CCP1 to CCPN. The coupling capacitors CCP1 to CCPM are located at a periphery region 506. The periphery region 506 and the passive matrix 308 are non-overlapped. A difference between the display 500 and the display 300 is that the coupling capacitors CCP1 to CCPN of the coupling capacitor group 504 are arranged along the horizontal axis direction X.

Figure 6:
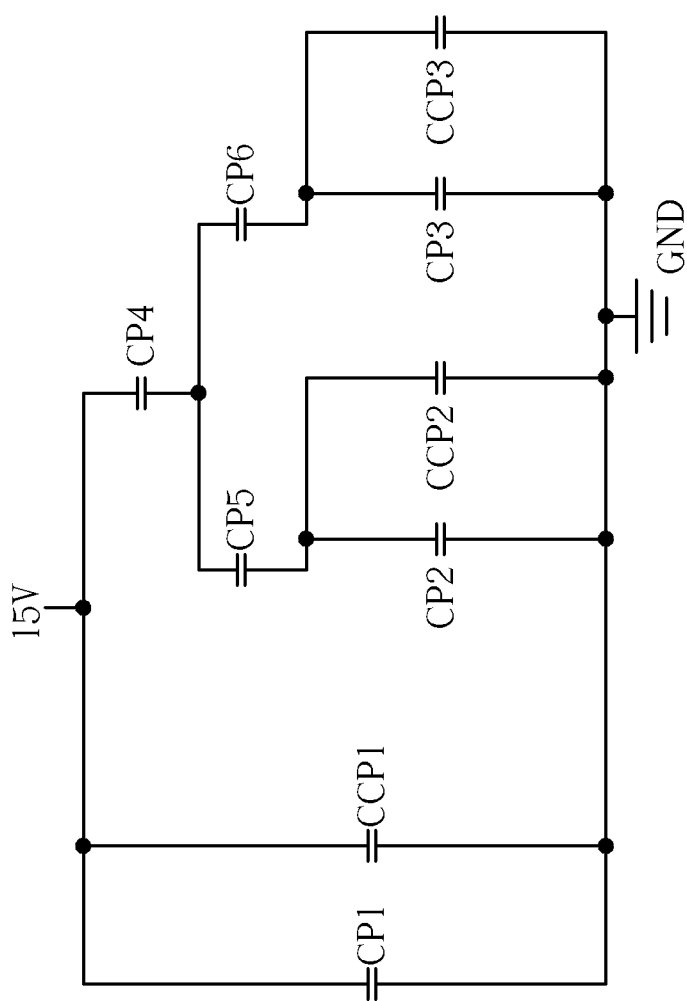
FIG. 6 is a diagram illustrating an equivalent circuit of storage capacitors corresponding to pixels adjacent to the pixel when the pixel is driven.

As shown in FIG. 5, when the pixel P1 is driven according to a driving voltage (e.g., 15V), the first trace C1 receives the driving voltage (e.g., 15V), the second trace R1 and the second trace RM are coupled to the ground GND (e.g., 0V), and other first traces of the plurality of first traces C1 to CN and other second traces of the plurality of second traces R1 to RM are floating. Therefore, please refer to FIG. 6. FIG. 6 is a diagram illustrating an equivalent circuit of the storage capacitors CP2 to CP9 corresponding to the pixels P2 to P9 adjacent to the pixel P1 when the pixel P1 is driven. It should be noted that FIG. 6 is only used to describe the present invention, and the present invention is not limited to pixels adjacent to the pixel P1 are only the pixels P2 to P9. As shown in FIGS. 5 and 6, when the pixel P1 is driven according to the driving voltage (e.g., 15V), because the coupling capacitor CCP2 is parallel to the pixel P2 and the coupling capacitor CCP3 is parallel to the pixel P3, the coupling capacitor CCP2 can reduce a coupling voltage coupled to the pixel P2 and the coupling capacitor CCP3 can reduce a coupling voltage coupled to the pixel P3. In addition, subsequent operational principles of the display 500 are the same as those of the display 300, so further description thereof is omitted for simplicity.

Figure 7:
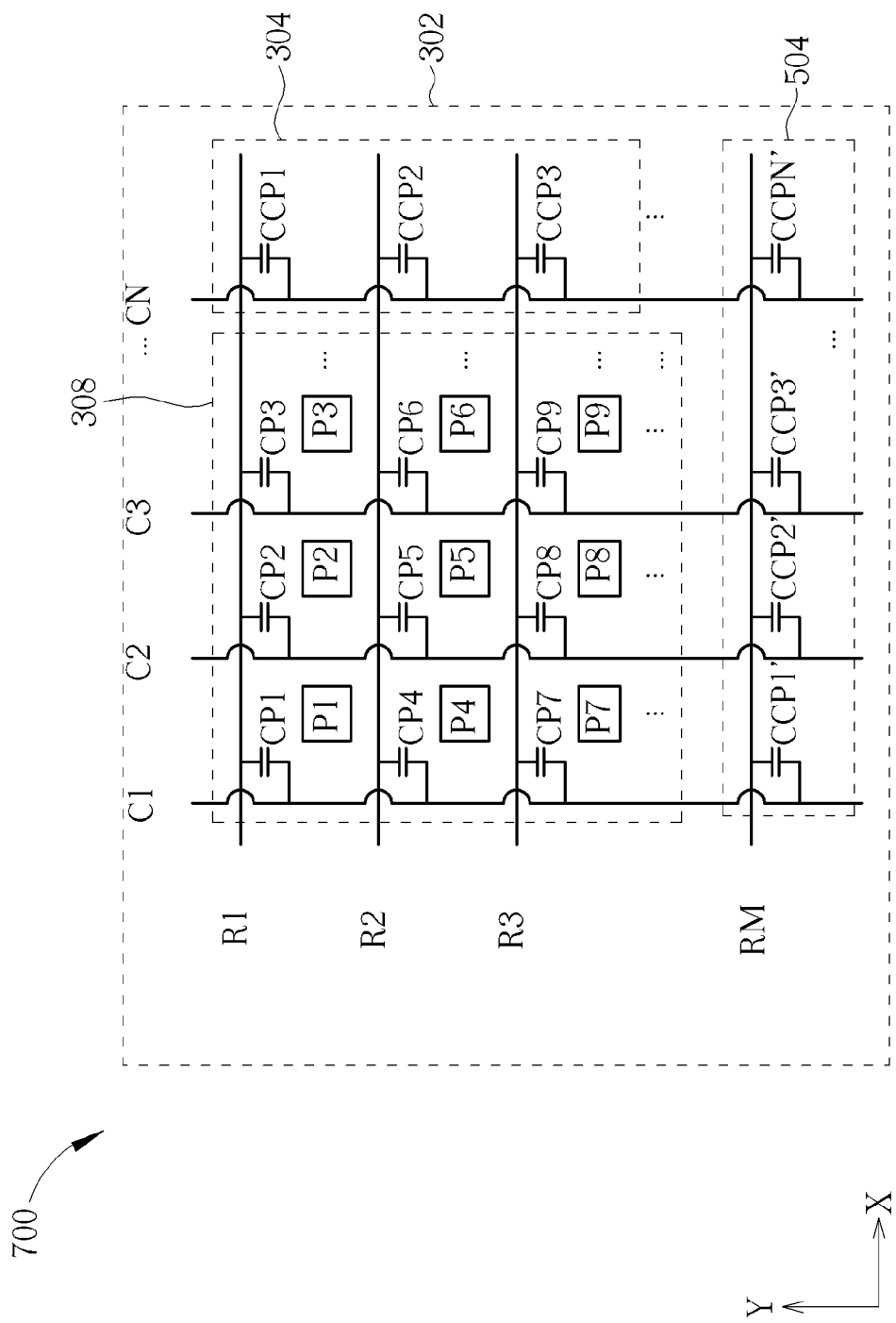
FIG. 7 is a diagram illustrating a display capable of reducing passive matrix coupling effect according to another embodiment of the present invention.

Please refer to FIG. 7. FIG. 7 is a diagram illustrating a display 700 capable of reducing passive matrix coupling effect according to another embodiment of the present invention. As shown in FIG. 7, a difference between the display 700 and the display 300 is that the display 700 has two coupling capacitor groups 304 and 504. The coupling capacitor group 304 has a plurality of coupling capacitors CCP1 to CCPN, and the coupling capacitor group 504 has a plurality of coupling capacitors CCP1' to CCPN'. The coupling capacitors CCP1 to CCPN of the coupling capacitor group 304 are arranged along the vertical axis direction Y, and the coupling capacitors CCP1' to CCPN' of the coupling capacitor group 504 are arranged along the horizontal axis direction X. In addition, subsequent operational principles of the display 700 are the same as those of the display 300, so further description thereof is omitted for simplicity.

Figure 8:
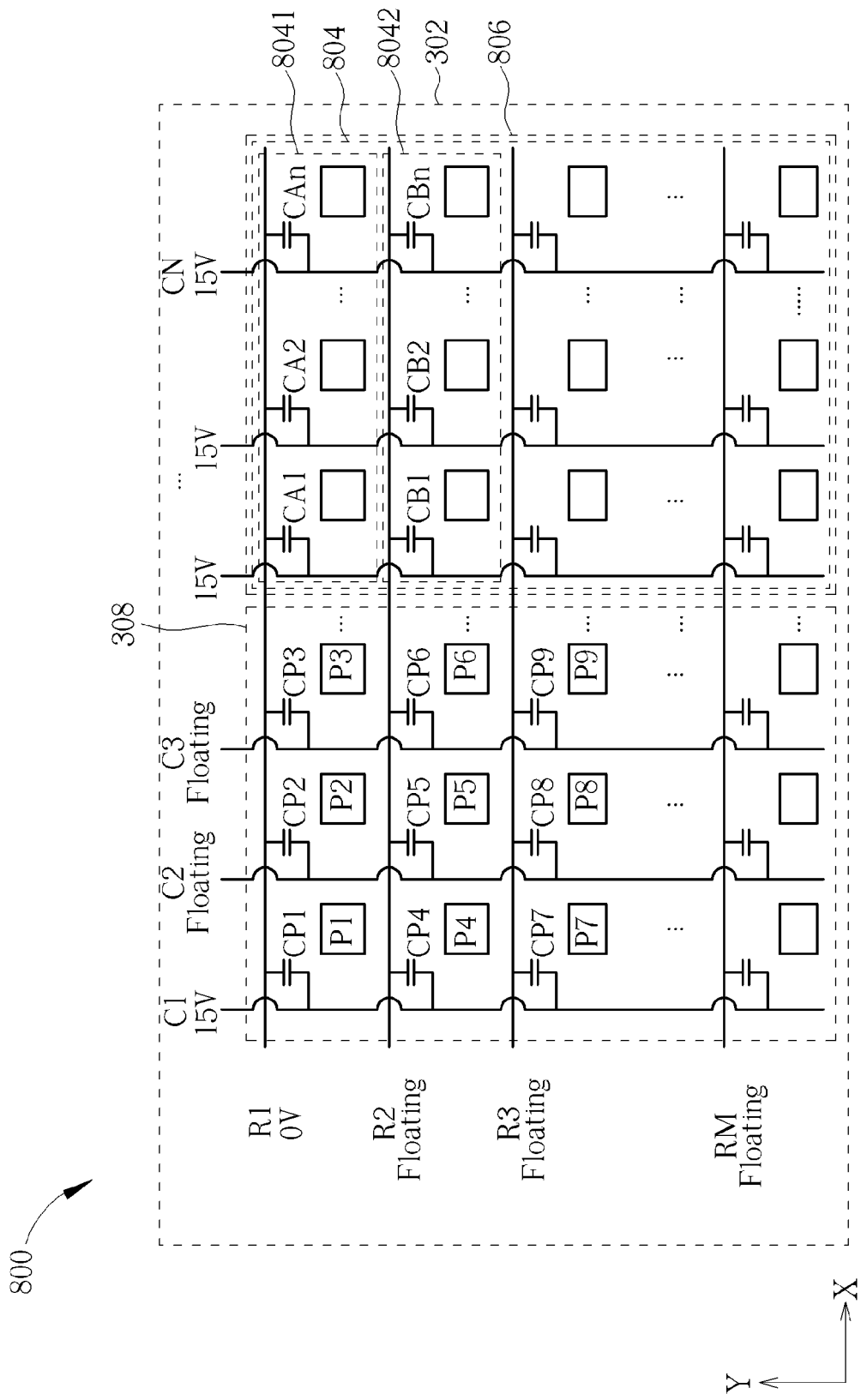
FIG. 8 is a diagram illustrating a display capable of reducing passive matrix coupling effect according to another embodiment of the present invention.

Please refer to FIG. 8. FIG. 8 is a diagram illustrating a display 800 capable of reducing passive matrix coupling effect according to another embodiment of the present invention. As shown in FIG. 8, a difference between the display 800 and the display 300 is that each coupling capacitor of a coupling capacitor group 804 is composed of a plurality of storage capacitors of a plurality of pixels included in the panel 302, where the coupling capacitor group 804 is located at a non-active region 806 of the panel 302, and the non-active region 806 and the passive matrix 308 are non-overlapped. For example, the coupling capacitor CCP1 is composed of a plurality of storage capacitors CA1 to CAn in the group 8041; the coupling capacitor CCP2 is composed of a plurality of storage capacitors CB1 to CBn in the group 8042. In addition, subsequent operational principles of the display 800 are the same as those of the display 300, so further description thereof is omitted for simplicity.

Figure 9:
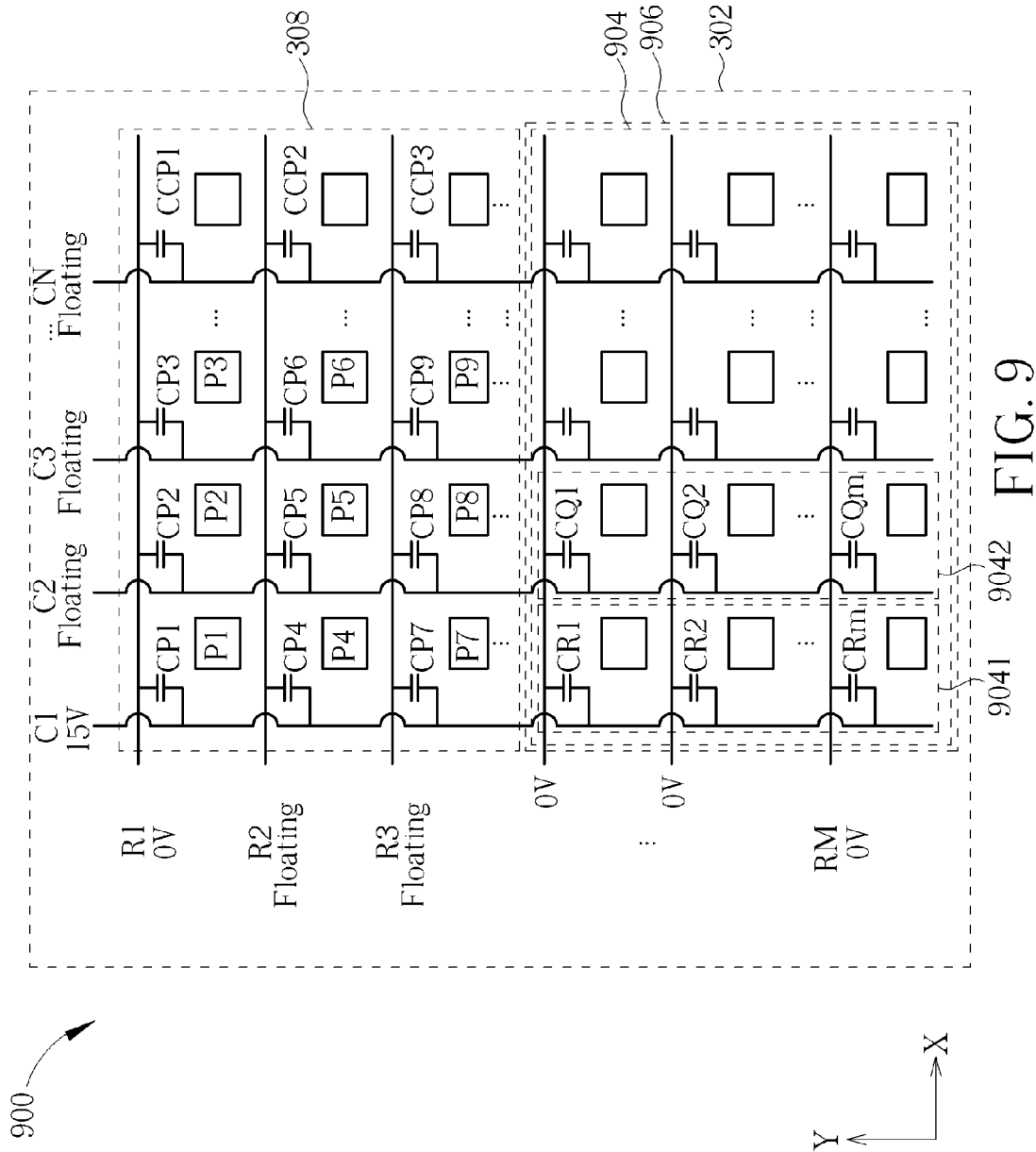
FIG. 9 is a diagram illustrating a display capable of reducing passive matrix coupling effect according to another embodiment of the present invention.

Please refer to FIG. 9. FIG. 9 is a diagram illustrating a display 900 capable of reducing passive matrix coupling effect according to another embodiment of the present invention. As shown in FIG. 9, a difference between the display 900 and the display 500 is that each coupling capacitor of a coupling capacitor group 904 is composed of a plurality of storage capacitors of a plurality of pixels included in the panel 302, where the coupling capacitor group 904 is located at a non-active region 906 of the panel 302, and the non-active region 906 and the passive matrix 308 are non-overlapped. For example, the coupling capacitor CCP1 of the coupling capacitor group 904 is composed of a plurality of storage capacitors CR1 to CRm in the group 9041; the coupling capacitor CCP2 of the coupling capacitor group 904 is composed of a plurality of storage capacitors CQ1 to CQm in the group 9042. In addition, subsequent operational principles of the display 900 are the same as those of the display 500, so further description thereof is omitted for simplicity.

Figure 10:
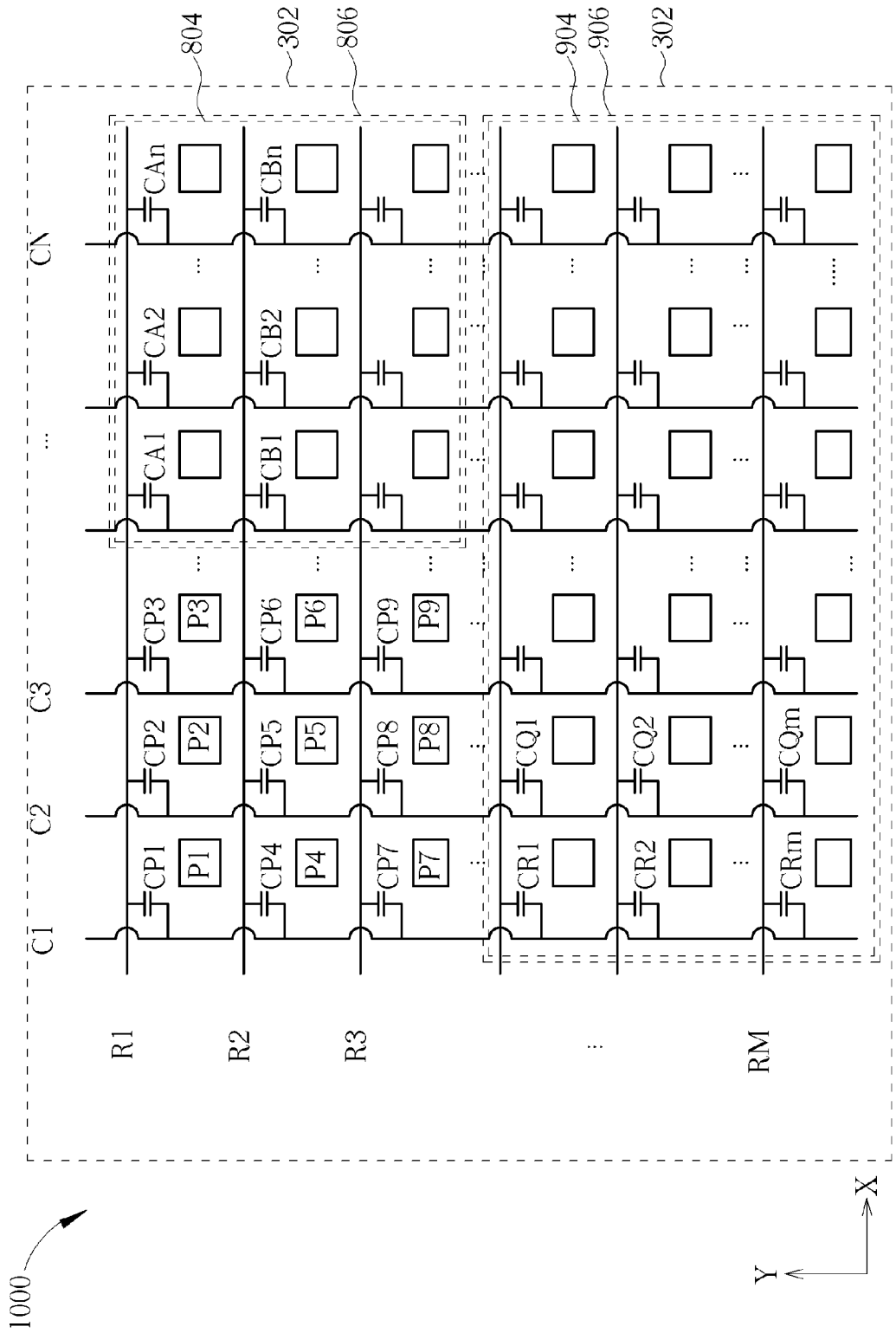
FIG. 10 is a diagram illustrating a display capable of reducing passive matrix coupling effect according to another embodiment of the present invention.

Please refer to FIG. 10. FIG. 10 is a diagram illustrating a display 1000 capable of reducing passive matrix coupling effect according to another embodiment of the present invention. As shown in FIG. 10, a difference between the display 1000 and the display 900 is that the display 1000 further comprises a coupling capacitor group 804, where the coupling capacitor group 804 is located at the non-active region 806 of the panel 302. In addition, subsequent operational principles of the display 1000 are the same as those of the display 900, so further description thereof is omitted for simplicity.

Figure 11:
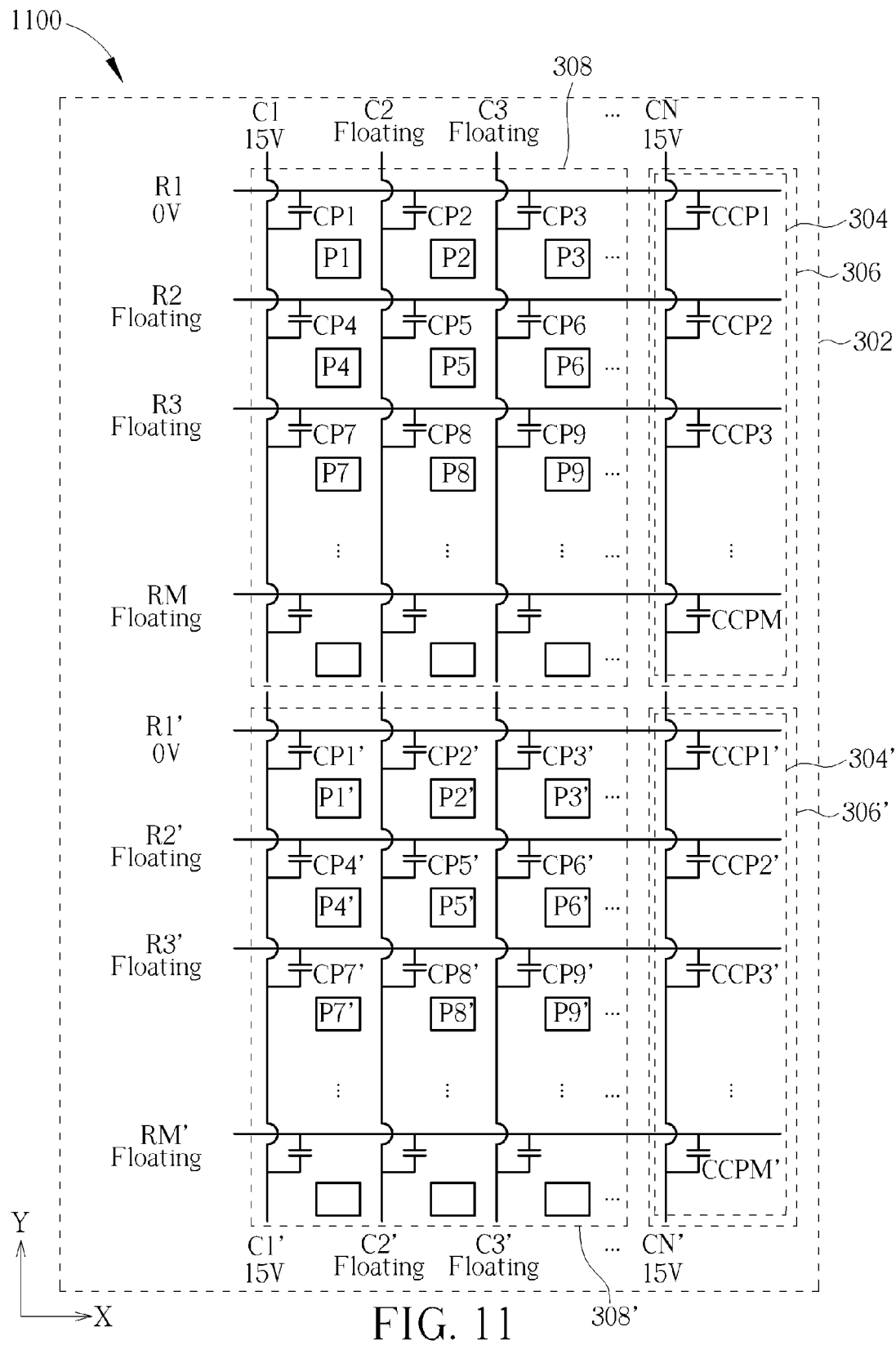
FIG. 11 is a diagram illustrating a display capable of reducing passive matrix coupling effect according to another embodiment of the present invention.

Please refer to FIG. 11. FIG. 11 is a diagram illustrating a display 1100 capable of reducing passive matrix coupling effect according to another embodiment of the present invention. As shown in FIG. 11, a difference between the display 1100 and the display 300 is that the panel 302 further comprises a second passive matrix 308' and a second coupling capacitor group 304', and that the display 1100 further comprises a plurality of third traces C1' to CN' and a plurality of fourth traces R1' to RM'. The second passive matrix 308' comprises a plurality of pixels (e.g., P1' to P9'), and the second coupling capacitor group 304' comprises a plurality of coupling capacitors CCP1' to CCPM'. The plurality of third traces C1' to CN' are extended along the vertical axis direction Y, and the plurality of fourth traces R1' to RM' are extended along the horizontal axis direction X. The coupling capacitors CCP1' to CCPM' are located at a periphery region 306' and arranged along the vertical axis direction Y. The periphery region 306' and the second passive matrix 308' are non-overlapped. Basically, subsequent operational principles of the second passive matrix 308' and the second coupling capacitor group 304' are the same as those of the passive matrix 308 and the coupling capacitor group 304, so further description thereof is omitted for simplicity. Since the display 1100 has two passive matrixes 308 and 308' and two coupling capacitor groups 304 and 304', two of the pixels of the display 1100 may be driven simultaneously. Moreover, because the pixels on the same column are driven by one of the first traces C1 to CN and one of the third traces C1' to CN', the length of each of the first traces C1 to CN and the length of each of the third traces C1' to CN' would not be too great. Accordingly, a response time for switching any pixel of the display 1100 from white to black and a response time for switching any pixel of the display 1100 from black to white may be maintained to be less than a predetermined value (e.g., 300 microseconds).

Figure 12:
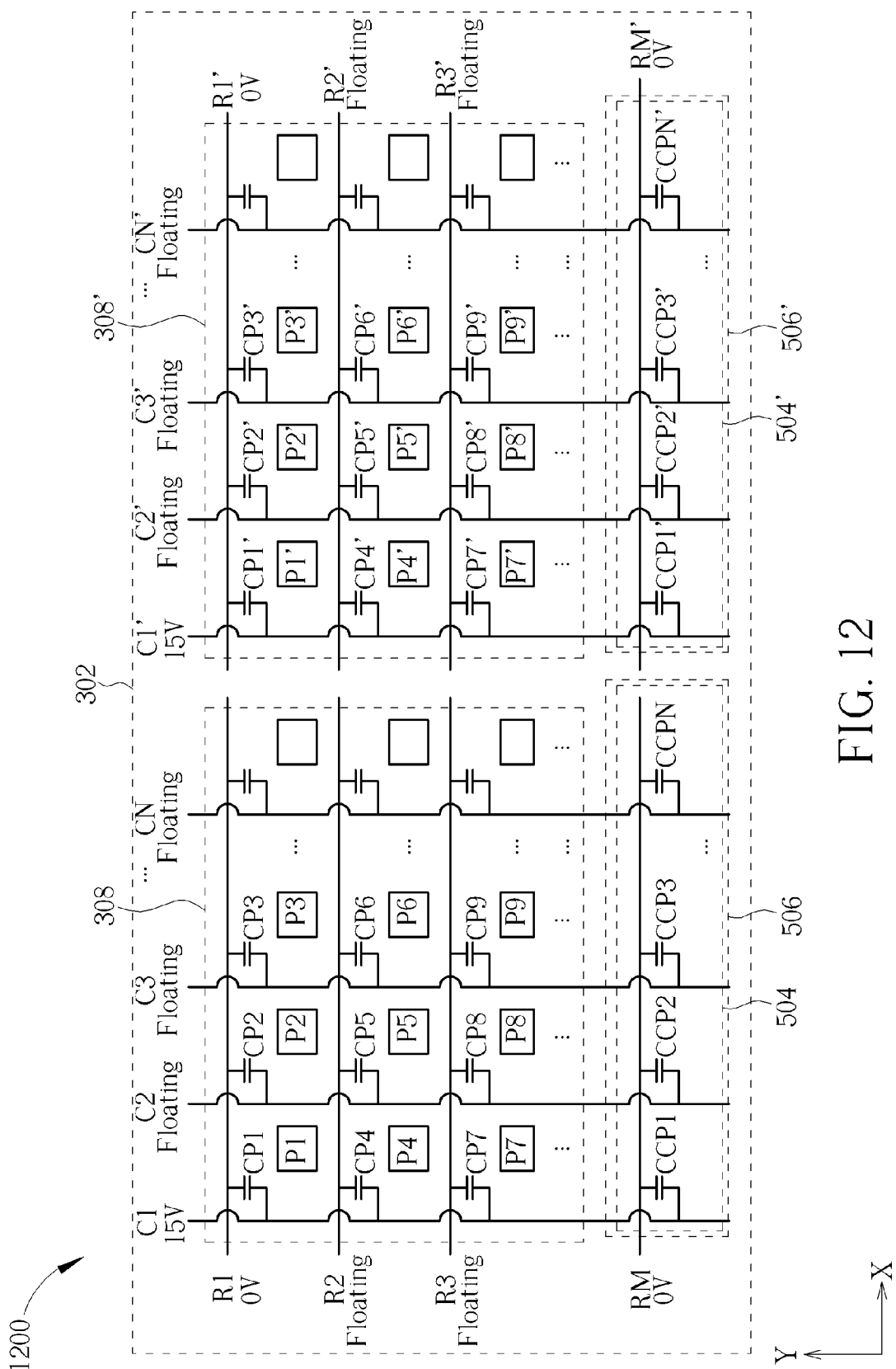
FIG. 12 is a diagram illustrating a display capable of reducing passive matrix coupling effect according to another embodiment of the present invention.

Please refer to FIG. 12. FIG. 12 is a diagram illustrating a display 1200 capable of reducing passive matrix coupling effect according to another embodiment of the present invention. As shown in FIG. 12, a difference between the display 1200 and the display 300 is that the panel 302 further comprises a second passive matrix 308' and a second coupling capacitor group 504', and that the display 1200 further comprises a plurality of third traces C1' to CN' and a plurality of fourth traces R1' to RM'. The second passive matrix 308' comprises a plurality of pixels (e.g., P1' to P9'), and the second coupling capacitor group 504' comprises a plurality of coupling capacitors CCP1' to CCPN'. The plurality of third traces C1' to CN' are extended along the vertical axis direction Y, and the plurality of fourth traces R1' to RM' are extended along the horizontal axis direction X. The coupling capacitors CCP1' to CCPM' are located at a periphery region 506' and arranged along the horizontal axis direction X. The periphery region 506' and the second passive matrix 308' are non-overlapped. Basically, subsequent operational principles of the second passive matrix 308' and the second coupling capacitor group 504' are the same as those of the passive matrix 308 and the coupling capacitor group 504, so further description thereof is omitted for simplicity. Since the display 1200 has two passive matrixes 308 and 308' and two coupling capacitor groups 504 and 504', two of the pixels of the display 1200 may be driven simultaneously. Moreover, because the pixels on the same row are driven by one of the second traces R1 to RM and one of the fourth traces R1' to RM', the length of each of the second traces R1 to RM and the length of each of the fourth traces R1' to RM' would not be too great. Accordingly, a response time for switching any pixel of the display 1200 from white to black and a response time for switching any pixel of the display 1200 from black to white may be maintained to be less than the predetermined value (e.g., 300 microseconds).

Figure 13:
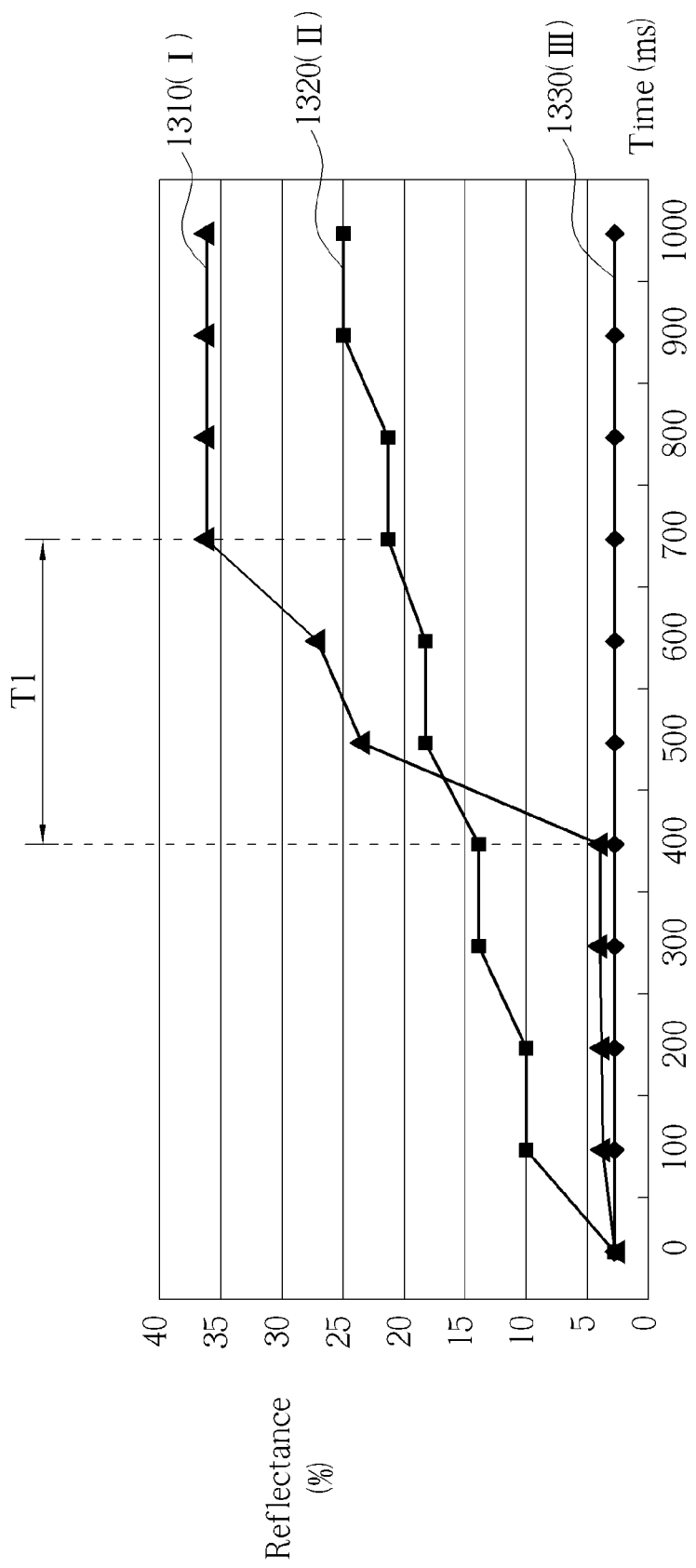
FIG. 13 is a timing diagram of reflectance of pixels of three displays having display layers that are made of different compound materials when a pixel of each of the three displays is switched from black to white.
Figure 14:
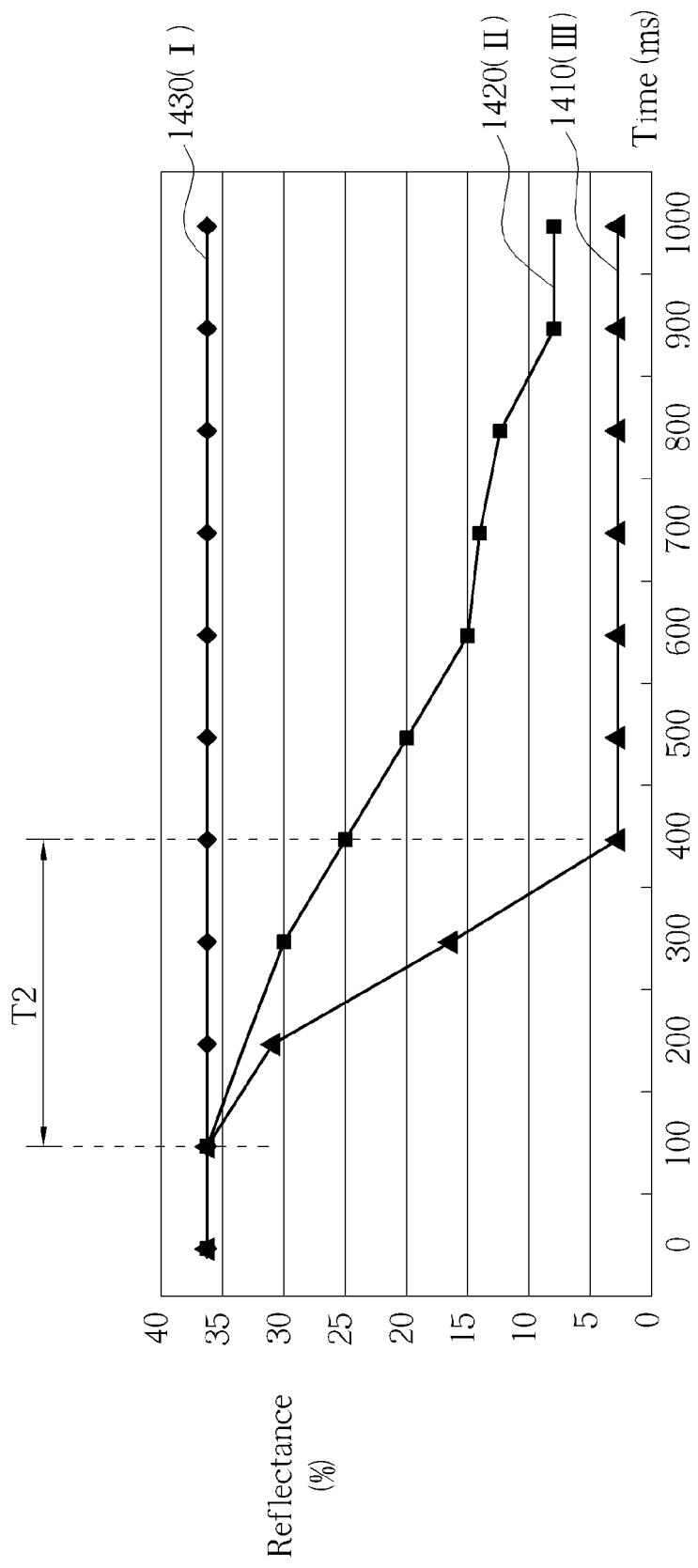
FIG. 14 is a timing diagram of reflectance of pixels of the three displays when a pixel of each of the three displays is switched from white to black.

In other embodiments of the present invention, the compound materials constitute the display layer (e.g., electrophoretic layer) of the display may be choose properly, such that the response time for switching any pixel of the display from white to black or from black to white may be maintained to be less than the predetermined value (e.g., 300 microseconds). Generally, reflectance of a pixel is used to determine whether the pixel is a black pixel or a white pixel. For an electrophoretic display, if a pixel thereof is a black pixel, the reflectance of the pixel is about 3%; if the pixel is a white pixel, the reflectance of the pixel is about 36%. Please refer to FIGS. 13 and 14. FIG. 13 is a timing diagram of reflectance of pixels of three displays having display layers that are made of different compound materials when a pixel of each of the three displays is switched from black to white, and FIG. 14 is a timing diagram of reflectance of pixels of the three displays when a pixel of each of the three displays is switched from white to black. Each of the curves 1310, 1320 and 1330 is corresponded to one of the three displays and represents the variations of the reflectance of a pixel of the corresponding display. Similarly, each of the curves 1410, 1420 and 1430 is corresponded to one of the three displays and represents the variations of the reflectance of a pixel of the corresponding display. The display corresponded to the curves 1310 and 1410 has a display layer made of a first compound material I, the display corresponded to the curves 1320 and 1420 has a display layer made of a second compound material II, and the display corresponded to the curves 1330 and 1430 has a display layer made of a third compound material III. As represented by the curves 1320, 1330, 1420 and 1430, the display corresponded to the second compound material II or the third compound material III has a response time greater than 300 microseconds for switching a pixel thereof form white to black or from black to white. Conversely, as represented by the curves 1310 and 1410, the display corresponded to the first compound material I has a response time T1 for switching a pixel thereof from white to black and a response time T2 for switching the pixel from black to white, where both of T1 and T2 are less than 300 microseconds. Therefore, the first compound material I is more proper than the second compound material II and the third compound material III to be selected as the compound material that constitutes the display layer of the display.

To sum up, the display capable of reducing passive matrix coupling effect utilizes a plurality of coupling capacitors of a coupling capacitor group to reduce coupling voltages coupled to a plurality of pixels corresponding to a pixel when the pixel is driven according to a driving voltage. Thus, compared to the prior art, the present invention can ensure that each pixel of the panel displays a color wanted by a user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display, comprising:
a panel comprising a first passive matrix and a first coupling capacitor group, the first passive matrix comprising a plurality of first pixels, and the first coupling capacitor group comprising a plurality of first coupling capacitors;
a plurality of first traces; and
a plurality of second traces;
wherein each of the first pixels is driven by a driving voltage stored by a first storage capacitor, a first end of the first storage capacitor is directly coupled to a specific first trace of the plurality of first traces, a second end of the first storage capacitor is directly coupled to a specific second trace of the plurality of second traces, the specific second trace is further directly coupled to a first end of a specific first coupling capacitor of the plurality of first coupling capacitors, a second end of the specific first coupling capacitor is directly coupled to another first trace, and the specific first coupling capacitor is not directly connected to any of the first pixels.

2. The display of claim 1, wherein the plurality of first traces are extended along a first direction, the plurality of second traces are extended along a second direction, and the second direction is perpendicular to the first direction.

3. The display of claim 2, wherein the first coupling capacitors are arranged along the first direction.

4. The display of claim 1, wherein the display is an electrophoretic display.

5. The display of claim 1, wherein when the each of the first pixels is driven according to the driving voltage, the specific first trace and the another first trace receive the driving voltage, the specific second trace is grounded, and other first traces of the plurality of first traces and other second traces of the plurality of second traces are floating.

6. The display of claim 1, wherein capacitances of the plurality of first coupling capacitors are the same.

7. The display of claim 1, wherein capacitances of the plurality of first coupling capacitors are different.

8. The display of claim 1, wherein the first coupling capacitor group is located at a first non-active region of the panel, and the first non-active region and the first passive matrix are non-overlapped.

9. The display of claim 1, wherein a response time for switching any of the first pixels from white to black and a response time for switching any of the first pixels from black to white are less than 300 microseconds.

10. The display of claim 1, wherein the panel further comprises comprising a second passive matrix and a second coupling capacitor group, the second passive matrix comprises a plurality of second pixels, the second coupling capacitor group comprises a plurality of second coupling capacitors, and the display further comprises:
a plurality of third traces; and
a plurality of fourth traces;
wherein each of the second pixels driven by a second driving voltage stored by a second storage capacitor, a second end of the second storage capacitor is directly coupled to a specific third trace of the plurality of third traces, a second end of the second storage capacitor is directly coupled to a specific fourth trace of the plurality of fourth traces, the specific fourth trace is further directly coupled to a first end of a specific second coupling capacitor of the plurality of second coupling capacitors, a second end of the specific second coupling capacitor is directly coupled to another third trace, and the specific second coupling capacitor is not directly connected to any of the second pixels.

11. The display of claim 10, wherein the plurality of first traces and the plurality of third traces are extended along a first direction, the plurality of second traces and the plurality of fourth traces are extended along a second direction, and the second direction is perpendicular to the first direction.

12. The display of claim 11, wherein the first coupling capacitors and the second coupling capacitors are arranged along the first direction.

13. The display of claim 10, wherein when the each of the first pixels is driven according to the first driving voltage, the specific first trace and the another first trace receive the first driving voltage, the specific second trace is grounded, and other first traces of the plurality of first traces and other second traces of the plurality of second traces are floating;
wherein when the each of the second pixels is driven according to the first driving voltage, the specific third trace and the another third trace receive the first driving voltage, the specific fourth trace is grounded, and other third traces of the plurality of third traces and other fourth traces of the plurality of fourth traces are floating.

14. The display of claim 10, wherein capacitances of the plurality of first coupling capacitors are the same, and capacitances of the plurality of second coupling capacitors are the same.

15. The display of claim 10, wherein capacitances of the plurality of first coupling capacitors are different, and capacitances of the plurality of second coupling capacitors are different.

16. The display of claim 10, wherein the first coupling capacitor group is located at a first non-active region of the panel, the second coupling capacitor group is located at a second non-active region of the panel, the first non-active region and the first passive matrix are non-overlapped, and the second non-active region and the second passive matrix are non-overlapped.

17. The display of claim 10, wherein a response time for switching any of the first pixels from white to black and a response time for switching any of the first pixels from black to white are less than 300 microseconds, and a response time for switching any of the second pixels from white to black and a response time for switching any of the second pixels from black to white are less than 300 microseconds.

\* \* \* \* \*